United States Patent
Gunzelmann et al.

(10) Patent No.: US 12,231,171 B2
(45) Date of Patent: Feb. 18, 2025

(54) ELECTRONIC DEVICES WITH HIGH FREQUENCY SYMBOL GENERATION

(71) Applicant: Apple Inc., Cupertino, CA (US)

(72) Inventors: Bertram R Gunzelmann, Koenigsbrunn (DE); Ramin Khayatzadeh, Munich (DE)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 17/895,860

(22) Filed: Aug. 25, 2022

(65) Prior Publication Data
US 2024/0072905 A1    Feb. 29, 2024

(51) Int. Cl.
| H04B 10/548 | (2013.01) |
| H04B 10/2575 | (2013.01) |
| H04J 14/02 | (2006.01) |
| H04L 27/26 | (2006.01) |

(52) U.S. Cl.
CPC ..... *H04B 10/548* (2013.01); *H04B 10/25759* (2013.01); *H04J 14/0298* (2013.01); *H04L 27/2697* (2013.01)

(58) Field of Classification Search
None
See application file for complete search history.

(56) References Cited

U.S. PATENT DOCUMENTS

| 5,933,113 A * | 8/1999 | Newberg | H01Q 25/00 |
| | | | 342/368 |
| 7,929,864 B2 * | 4/2011 | Chen | H01Q 3/2676 |
| | | | 398/186 |
| 8,112,001 B2 * | 2/2012 | Lowery | H04B 10/6163 |
| | | | 398/208 |
| 8,149,758 B2 * | 4/2012 | Shoji | H04B 1/40 |
| | | | 370/329 |
| 8,699,880 B2 * | 4/2014 | Grigoryan | H04B 10/613 |
| | | | 398/205 |

(Continued)

FOREIGN PATENT DOCUMENTS

CN    113315582 A  *  8/2021  ........... H04B 10/503

OTHER PUBLICATIONS

Cano et al., Physical layer evaluation of OFDM-based access network, IEEE, 2011 (Year: 2011).*

(Continued)

*Primary Examiner* — Jai M Lee
(74) *Attorney, Agent, or Firm* — Treyz Law Group, P.C.; Michael H. Lyons

(57) ABSTRACT

An electronic device may include an optical demultiplexer, optical combiners, optical paths between the demultiplexer and the combiners, modulators on the optical paths, and a symbol generator that generates a set of electrical OFDM symbols. The modulators may generate a set of optical OFDM symbols by mixing optical carriers with the electrical OFDM symbols. The combiners may generate an aggregate optical OFDM symbol from the optical OFDM symbols and may combine the aggregate optical OFDM symbol with an optical local oscillator signal. The aggregate optical OFDM symbol may exhibit a large bandwidth. The combiners may illuminate a photodiode, which produces current on an antenna resonating element that radiates a radio-frequency signal at frequencies greater than 100 GHz.

19 Claims, 9 Drawing Sheets

(56) References Cited

U.S. PATENT DOCUMENTS

| | | | | |
|---|---|---|---|---|
| 8,699,882 | B2* | 4/2014 | Shieh | H04L 27/26538 |
| | | | | 398/79 |
| 9,294,216 | B2* | 3/2016 | Lowery | H04L 5/0046 |
| 9,608,723 | B2* | 3/2017 | Chen | H04J 14/0227 |
| 9,692,139 | B2* | 6/2017 | Kowalevicz | H01Q 21/00 |
| 9,838,125 | B2* | 12/2017 | Prucnal | H04B 10/1123 |
| 10,505,639 | B2* | 12/2019 | Flint | H04J 14/0213 |
| 2023/0254039 | A1* | 8/2023 | Meinecke | G01S 13/87 |
| | | | | 398/118 |

OTHER PUBLICATIONS

Misra et al., Guide to Wireless Mesh Networks, Springer, 2009 (Year: 2009).*

Machine translation of CN 113315582 A (Year: 2021).*

Braun et al., Maximum Likelihood Speed and Distance Estimation for OFDM Radar, 2014 (Year: 2014).*

Ionnis Tomkos et al., Switching and Routing for spectrally and spatially flexible optical networking, IEEE HPSR 2015 Tutorial, Jul. 2015, IEEE, New York, NY, United States.

Zhennan Zheng et al., Orthogonal-band-multiplexed offset-QAM optical superchannel generation and coherent detection, Scientific Reports, Dec. 2015, pp. 1-10, Springer Nature, New York, NY, United States.

Peter W. Smith, Mode-Locking of Lasers, Proceedings of the IEEE, Sep. 1790, pp. 1342-1357, vol. 58, No. 9, IEEE, New York, NY, United States.

Benjamin Nuss et al., Frequency Comb OFDM Radar System With High Range Resolution and Low Sampling Rate, IEEE Transactions on Microwave Theory and Techniques, Sep. 2020, pp. 3861-3871, vol. 68, No. 9, IEEE, New York, NY, United States.

Bill Corcoran et al., Folded orthogonal frequency division multiplexing, Optics Express, Dec. 2016, pp. 29670-29681, vol. 24, No. 26, Optical Society of America, Washington D.C., United States.

Binhuang Song et al., Banded all-optical OFDM super-channels with low-bandwidth receivers, Optics Express, Aug. 2016, pp. 17968-17979, vol. 24, No. 16, Optical Society of America, Washington D.C., United States.

Mingzhi Lu et al, An Integrated Heterodyne Optical Phase-locked Loop with Record Offset Locking Frequency, Conference on Optical Fiber Communication, Mar. 2014, IEEE, New York, NY, United States.

D. Hillerkuss et al., 26 Tbit $s^{-1}$ line-rate super-channel transmission utilizing all-optical fast Fourier transform processing, nature photonics, Jun. 2011, pp. 364-371, vol. 5, Macmillan Publishers Limited, New York, NY, United States.

* cited by examiner

ELECTRONIC DEVICES WITH HIGH FREQUENCY SYMBOL GENERATION

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. In addition, it is often desirable for the electronic device to be able to communicate with multiple external devices at once or with as large a bandwidth as possible.

SUMMARY

An electronic device may include wireless circuitry that transmits radio-frequency signals at frequencies greater than 100 GHz. The wireless circuitry may include an optical local oscillator (LO) that generates an optical LO signal on a first optical path. The first optical path may be coupled to a first input of a first optical combiner. The wireless circuitry may include an optical frequency comb generator coupled to a second input of the first optical combiner over a second optical path.

The second optical path may include an optical demultiplexer, a second optical combiner, and a set of optical paths coupled between outputs of the optical demultiplexer and inputs of the second optical combiner. A respective electro-optical modulator may be disposed on each of the optical paths in the set of optical paths. A symbol generator may be coupled to the electro-optical modulators over electrical paths. The symbol generator may generate a set of electrical orthogonal frequency domain multiplexing (OFDM) symbols. Each electrical OFDM symbol may have a set of subcarriers. The symbol generator may provide the electrical OFDM symbols to the electro-optical modulators.

The optical frequency comb generator may generate an optical frequency comb symbol having a set of optical carriers. The optical demultiplexer may distribute each optical carrier from the optical frequency comb signal to different respective optical paths in the set of optical paths. The electro-optical modulators may generate a set of optical OFDM symbols by mixing the optical carriers with the electrical OFDM symbols. The second optical combiner may generate an aggregate optical OFDM symbol by combining the optical OFDM symbols generated by the electro-optical modulators. The first optical combiner may generate a combined signal by combining the aggregate optical OFDM symbol with the optical LO signal. The aggregate optical OFDM symbol may exhibit a large bandwidth. The first optical combiner may illuminate a photodiode using the combined signal. The photodiode may produce current on an antenna resonating element based on the combined signal and the current may radiate the radio-frequency signal.

An aspect of the disclosure provides an electronic device. The electronic device can include one or more processors configured to generate a first electrical symbol and a second electrical symbol. The electronic device can include one or more light sources configured to generate an optical signal having a first carrier at a first frequency and a second carrier at a second frequency different from the first frequency. The electronic device can include a first modulator configured to generate a first optical symbol by modulating the first carrier of the optical signal using the first electrical symbol. The electronic device can include a second modulator configured to generate a second optical symbol by modulating the second carrier of the optical signal using the second electrical symbol. The electronic device can include an antenna configured to transmit a radio-frequency signal generated based on the first optical symbol and the second optical symbol.

An aspect of the disclosure provides an electronic device. The electronic device can include an optical demultiplexer. The electronic device can include one or more optical combiners. The electronic device can include a set of optical paths coupled in parallel between outputs of the optical demultiplexer and inputs of the one or more optical combiners. The electronic device can include a set of electro-optical modulators, each electro-optical modulator in the set of electro-optical modulators being disposed on a respective one of the optical paths in the set of optical paths. The electronic device can include a symbol generator coupled to the set of electro-optical modulators, the symbol generator being configured to provide a different respective electrical orthogonal frequency division multiplexing (OFDM) symbol to each electro-optical modulator in the set of electro-optical modulators. The electronic device can include a photodiode coupled to an output of the one or more optical combiners. The electronic device can include an antenna resonating element coupled to the photodiode.

An aspect of the disclosure provides a method of operating an electronic device to transmit a radio-frequency signal. The method can include with one or more processors, generating a set of electrical orthogonal frequency division multiplexing (OFDM) symbols. The method can include with a set of electro-optical modulators, generating a set of optical OFDM symbols by mixing each electrical OFDM symbol in the set of electrical OFDM symbols with a different respective optical carrier. The method can include with a light source, generating an optical signal. The method can include with an optical combiner, generating a combined signal by combining the optical signal with the set of optical OFDM symbols. The method can include with a photodiode, generating a current on an antenna resonating element based on the combined signal. The method can include with the antenna resonating element, transmitting a radio-frequency signal associated with the current.

DETAILED DESCRIPTION

Figure 1:
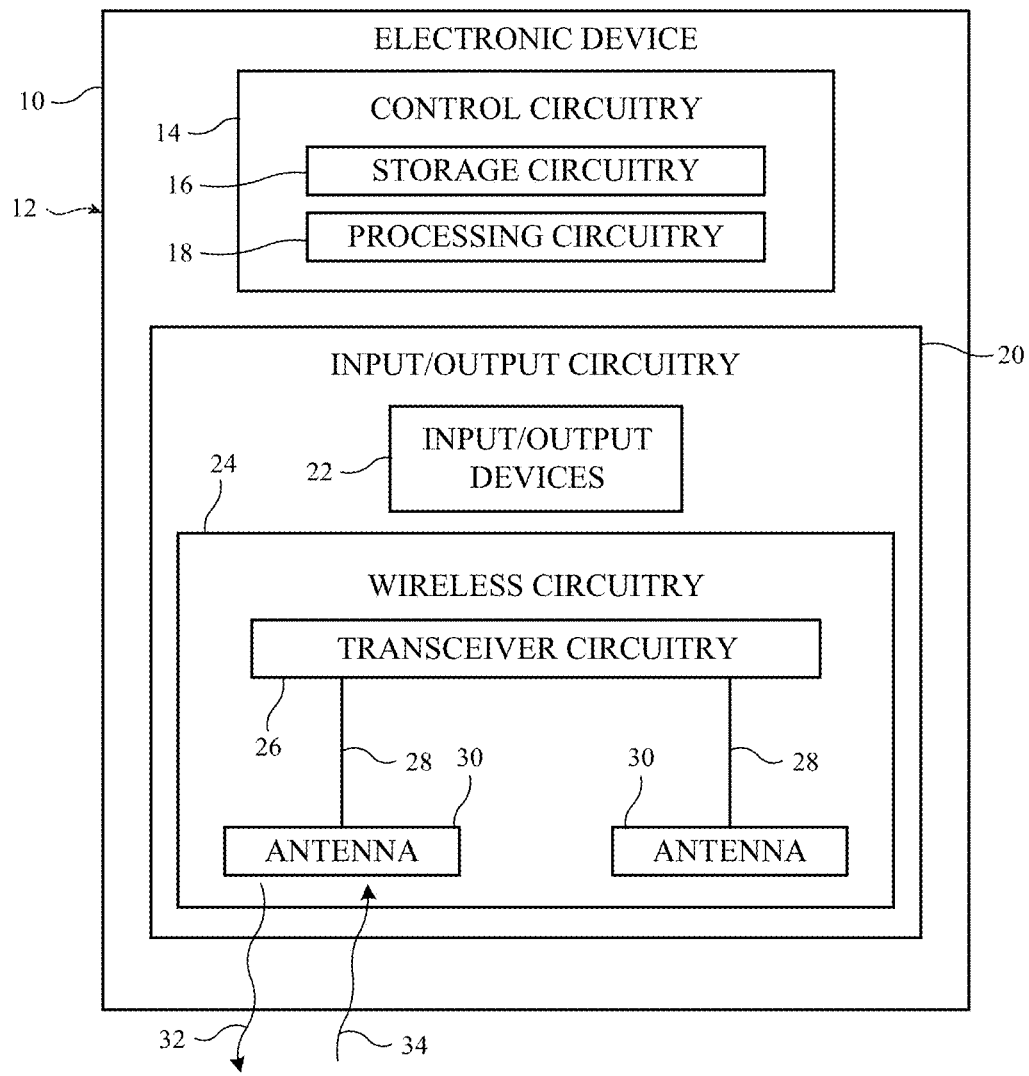
FIG. 1 is a block diagram of an illustrative electronic device having wireless circuitry with at least one antenna that conveys wireless signals at frequencies greater than about 100 GHz in accordance with some embodiments.

Electronic device 10 of FIG. 1 (sometimes referred to herein as electro-optical device 10) may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors such as microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas 30. Wireless circuitry 24 may also include transceiver circuitry 26. Transceiver circuitry 26 may include transmitter circuitry, receiver circuitry, modulator circuitry, demodulator circuitry (e.g., one or more modems), radio-frequency circuitry, one or more radios, intermediate frequency circuitry, optical transmitter circuitry, optical receiver circuitry, optical light sources, other optical components, baseband circuitry (e.g., one or more baseband processors), amplifier circuitry, clocking circuitry such as one or more local oscillators and/or phase-locked loops, memory, one or more registers, filter circuitry, switching circuitry, analog-to-digital converter (ADC) circuitry, digital-to-analog converter (DAC) circuitry, radio-frequency transmission lines, optical fibers, and/or any other circuitry for transmitting and/or receiving wireless signals using antennas 30. The components of transceiver circuitry 26 may be implemented on one integrated circuit, chip, system-on-chip (SOC), die, printed circuit board, substrate, or package, or the components of transceiver circuitry 26 may be distributed across two or more integrated circuits, chips, SOCs, printed circuit boards, substrates, and/or packages.

The example of FIG. 1 is merely illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of wireless circuitry 24. The baseband circuitry may, for example, access a communication protocol stack on control circuitry 14 (e.g., storage circuitry 16) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

Transceiver circuitry 26 may be coupled to each antenna 30 in wireless circuitry 24 over a respective signal path 28. Each signal path 28 may include one or more radio-frequency transmission lines, waveguides, optical fibers, and/or any other desired lines/paths for conveying wireless signals between transceiver circuitry 26 and antenna 30. Antennas 30 may be formed using any desired antenna structures for conveying wireless signals. For example, antennas 30 may include antennas with resonating elements that are formed from dipole antenna structures, planar dipole antenna structures (e.g., bowtie antenna structures), slot antenna structures, loop antenna structures, patch antenna structures, inverted-F antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time.

If desired, two or more of antennas 30 may be integrated into a phased antenna array (sometimes referred to herein as a phased array antenna) in which each of the antennas conveys wireless signals with a respective phase and magnitude that is adjusted over time so the wireless signals constructively and destructively interfere to produce (form) a signal beam in a given pointing direction. The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between device 10 and external wireless communications equipment (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc.

Wireless circuitry 24 may transmit and/or receive wireless signals within corresponding frequency bands of the electromagnetic spectrum (sometimes referred to herein as communications bands or simply as "bands"). The frequency bands handled by communications circuitry 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-10 Gbps or higher, wireless circuitry 24 may convey wireless signals at frequencies greater than 100 GHz.

As shown in FIG. 1, wireless circuitry 24 may transmit wireless signals 32 and may receive wireless signals 34 at frequencies greater than around 100 GHz. Wireless signals 32 and 34 may sometimes be referred to herein as tremendously high frequency (THF) signals 32 and 34, sub-THz signals 32 and 34, THz signals 32 and 34, or sub-millimeter wave signals 32 and 34. THF signals 32 and 34 may be at sub-THz or THz frequencies such as frequencies between 100 GHz and 1 THz, between 100 GHz and 10 THz, between 100 GHz and 2 THz, between 200 GHz and 1 THz, between 300 GHz and 1 THz, between 300 GHz and 2 THz, between 300 GHz and 10 THz, between 100 GHz and 800 GHz, between 200 GHz and 1.5 THz, etc. (e.g., within a sub-THz, THz, THF, or sub-millimeter frequency band such as a 6G frequency band). The high data rates supported by these frequencies may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals 32 to another antenna 30 on a second chip in device 10), and/or to perform any other desired high data rate operations.

Space is at a premium within electronic devices such as device 10. In some scenarios, different antennas 30 are used to transmit THF signals 32 than are used to receive THF signals 34. However, handling transmission of THF signals 32 and reception of THF signals 34 using different antennas 30 can consume an excessive amount of space and other resources within device 10 because two antennas 30 and signal paths 28 would be required to handle both transmission and reception. To minimize space and resource consumption within device 10, the same antenna 30 and signal path 28 may be used to both transmit THF signals 32 and to receive THF signals 34. If desired, multiple antennas 30 in wireless circuitry 24 may transmit THF signals 32 and may receive THF signals 34. The antennas may be integrated into a phased antenna array that transmits THF signals 32 and that receives THF signals 34 within a corresponding signal beam oriented in a selected beam pointing direction.

It can be challenging to incorporate components into wireless circuitry 24 that support wireless communications at these high frequencies. If desired, transceiver circuitry 26 and signal paths 28 may include optical components that convey optical signals to support the transmission of THF signals 32 and the reception of THF signals 34 in a space and resource-efficient manner. The optical signals may be used in transmitting THF signals 32 at THF frequencies and in receiving THF signals 34 at THF frequencies.

Figure 2:
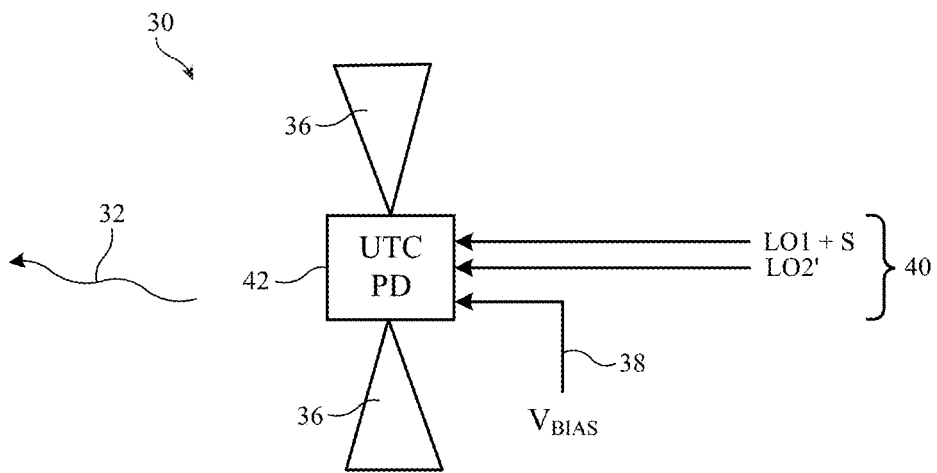
FIG. 2 is a top view of an illustrative antenna that transmits wireless signals at frequencies greater than about 100 GHz based on optical local oscillator (LO) signals in accordance with some embodiments.

FIG. 2 is a diagram of an illustrative antenna 30 that may be used to both transmit THF signals 32 and to receive THF signals 34 using optical signals. Antenna 30 may include one or more antenna radiating (resonating) elements such as radiating (resonating) element arms 36. In the example of FIG. 2, antenna 30 is a planar dipole antenna (sometimes referred to as a "bowtie" antenna) having two opposing radiating element arms 36 (e.g., bowtie arms or dipole arms). This is merely illustrative and, in general, antenna 30 may be any type of antenna having any desired antenna radiating element architecture.

As shown in FIG. 2, antenna 30 includes a photodiode (PD) 42 coupled between radiating element arms 36. Electronic devices that include antennas 30 with photodiodes 42 such as device 10 may sometimes also be referred to as electro-optical devices (e.g., electro-optical device 10). Photodiode 42 may be a programmable photodiode. An example in which photodiode 42 is a programmable uni-travelling-carrier photodiode (UTC PD) is described herein as an example. Photodiode 42 may therefore sometimes be referred to herein as UTC PD 42 or programmable UTC PD 42. This is merely illustrative and, in general, photodiode 42 may include any desired type of adjustable/programmable photodiode or component that converts electromagnetic energy (e.g., light or light energy) at optical frequencies (e.g., infrared, visible, and/or ultraviolet frequencies) to current at THF frequencies on radiating element arms 36 and/or vice versa. Each radiating element arm 36 may, for example, have a first edge at UTC PD 42 and a second edge opposite the first edge that is wider than the first edge (e.g., in implementations where antenna 30 is a bowtie antenna). Other radiating elements may be used if desired.

UTC PD 42 may have a bias terminal 38 that receives one or more control signals $V_{BIAS}$ Control signals $V_{BIAS}$ may include bias voltages provided at one or more voltage levels and/or other control signals for controlling the operation of UTC PD 42 such as impedance adjustment control signals for adjusting the output impedance of UTC PD 42. Control circuitry 14 (FIG. 1) may provide (e.g., apply, supply, assert, etc.) control signals $V_{BIAS}$ at different settings (e.g., values, magnitudes, etc.) to dynamically control (e.g., program or adjust) the operation of UTC PD 42 over time. For example, control signals $V_{BIAS}$ may be used to control whether antenna 30 transmits THF signals 32 or receives THF signals 34. When control signals $V_{BIAS}$ include a bias voltage asserted at a first level or magnitude, antenna 30 may be configured to transmit THF signals 32. When control signals $V_{BIAS}$ include a bias voltage asserted at a second level or magnitude, antenna 30 may be configured to receive THF signals 34. In the example of FIG. 2, control signals $V_{BIAS}$ include the bias voltage asserted at the first level to configure antenna 30 to transmit THF signals 32. If desired, control signals $V_{BIAS}$ may also be adjusted to control the waveform of the THF signals (e.g., as a squaring function that preserves the modulation of incident optical signals, a linear function, etc.), to perform gain control on the signals conveyed by antenna 30, and/or to adjust the output impedance of UTC PD 42.

As shown in FIG. 2, UTC PD 42 may be optically coupled to optical path 40. Optical path 40 may include one or more optical fibers or waveguides. UTC PD 42 may receive optical signals from transceiver circuitry 26 (FIG. 1) over optical path 40. The optical signals may include a first optical local oscillator (LO) signal LO1 and a second optical local oscillator signal LO2. Optical local oscillator signals LO1 and LO2 may be generated by light sources in transceiver circuitry 26 (FIG. 1). Optical local oscillator signals LO1 and LO2 may be at optical wavelengths (e.g., between 400 nm and 700 nm), ultra-violet wavelengths (e.g., near-ultra-violet or extreme ultraviolet wavelengths), and/or infrared wavelengths (e.g., near-infrared wavelengths, mid-infrared wavelengths, or far-infrared wavelengths). Optical local oscillator signal LO2 may be offset in wavelength from optical local oscillator signal LO1 by a wavelength offset X. Wavelength offset X may be equal to the wavelength of the THF signals conveyed by antenna 30 (e.g., between 100 GHz and 1 THz (1000 GHz), between 100 GHz and 2 THz, between 300 GHz and 800 GHz, between 300 GHz and 1 THz, between 300 and 400 GHz, etc.).

During signal transmission, wireless data (e.g., wireless data packets, symbols, frames, etc.) may be modulated onto optical local oscillator signal LO2 to produce modulated optical local oscillator signal LO2'. If desired, optical local oscillator signal LO1 may be provided with an optical phase shift S. Optical path 40 may illuminate UTC PD 42 with optical local oscillator signal LO1 (plus the optical phase shift S when applied) and modulated optical local oscillator signal LO2'. If desired, lenses or other optical components may be interposed between optical path 40 and UTC PD 42 to help focus the optical local oscillator signals onto UTC PD 42.

UTC PD 42 may convert optical local oscillator signal LO1 and modulated local oscillator signal LO2' (e.g., beats between the two optical local oscillator signals) into antenna currents that run along the perimeter of radiating element arms 36. The frequency of the antenna currents is equal to the frequency difference between local oscillator signal LO1 and modulated local oscillator signal LO2'. The antenna currents may radiate (transmit) THF signals 32 into free space. Control signal $V_{BIAS}$ may control UTC PD 42 to convert the optical local oscillator signals into antenna currents on radiating element arms 36 while preserving the modulation and thus the wireless data on modulated local oscillator signal LO2' (e.g., by applying a squaring function to the signals). THF signals 32 will thereby carry the modulated wireless data for reception and demodulation by external wireless communications equipment.

Figure 3:
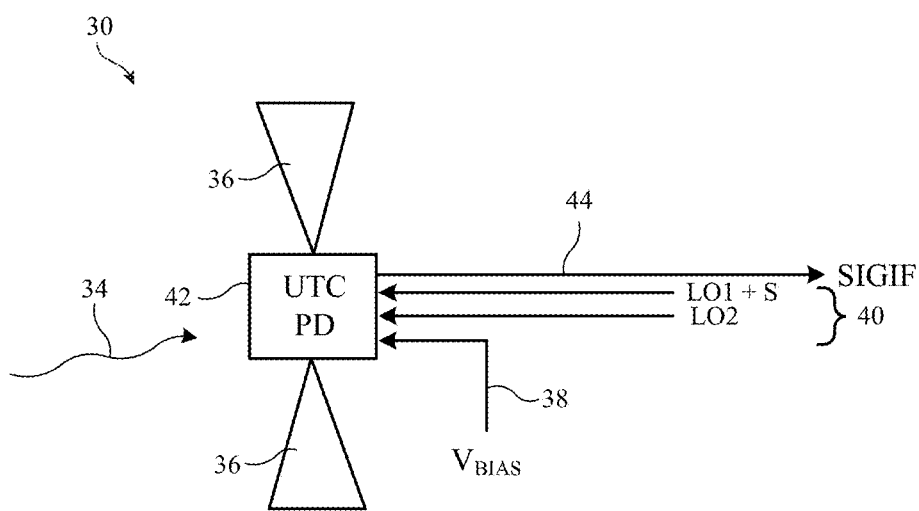
FIG. 3 is a top view showing how an illustrative antenna of the type shown in FIG. 2 may convert received wireless signals at frequencies greater than about 100 GHz into intermediate frequency signals based on optical LO signals in accordance with some embodiments.

FIG. 3 is a diagram showing how antenna 30 may receive THF signals 34 (e.g., after changing the setting of control signals $V_{BIAS}$ into a reception state from the transmission state of FIG. 2). As shown in FIG. 3, THF signals 34 may be incident upon antenna radiating element arms 36. The incident THF signals 34 may produce antenna currents that flow around the perimeter of radiating element arms 36. UTC PD 42 may use optical local oscillator signal LO1 (plus the optical phase shift S when applied), optical local oscillator signal LO2 (e.g., without modulation), and control signals $V_{BIAS}$ (e.g., a bias voltage asserted at the second level) to convert the received THF signals 34 into intermediate frequency signals SIGIF that are output onto intermediate frequency signal path 44.

The frequency of intermediate frequency signals SIGIF may be equal to the frequency of THF signals 34 minus the difference between the frequency of optical local oscillator signal LO1 and the frequency of optical local oscillator signal LO2. As an example, intermediate frequency signals SIGIF may be at lower frequencies than THF signals 32 and 34 such as centimeter or millimeter wave frequencies between 10 GHz and 100 GHz, between 30 GHz and 80 GHz, around 60 GHz, etc. If desired, transceiver circuitry 26 (FIG. 1) may change the frequency of optical local oscillator signal LO1 and/or optical local oscillator signal LO2 when switching from transmission to reception or vice versa. UTC PD 42 may preserve the data modulation of THF signals 34 in intermediate signals SIGIF. A receiver in transceiver circuitry 26 (FIG. 1) may demodulate intermediate frequency signals SIGIF (e.g., after further downconversion) to recover the wireless data from THF signals 34. In another example, wireless circuitry 24 may convert intermediate frequency signals SIGIF to the optical domain before recovering the wireless data. In yet another example, intermediate frequency signal path 44 may be omitted and UTC PD 42 may convert THF signals 34 into the optical domain for subsequent demodulation and data recovery (e.g., in a sideband of the optical signal).

Figure 4:
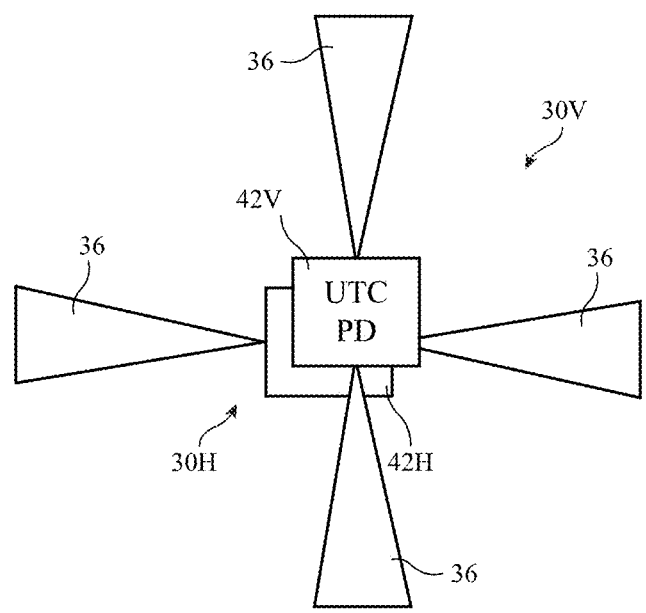
FIG. 4 is a top view showing how multiple antennas of the type shown in FIGS. 2 and 3 may be stacked to cover multiple polarizations in accordance with some embodiments.

The antenna 30 of FIGS. 2 and 3 may support transmission of THF signals 32 and reception of THF signals 34 with a given polarization (e.g., a linear polarization such as a vertical polarization). If desired, wireless circuitry 24 (FIG. 1) may include multiple antennas 30 for covering different polarizations. FIG. 4 is a diagram showing one example of how wireless circuitry 24 may include multiple antennas 30 for covering different polarizations.

As shown in FIG. 4, the wireless circuitry may include a first antenna 30 such as antenna 30V for covering a first polarization (e.g., a first linear polarization such as a vertical polarization) and may include a second antenna 30 such as antenna 30H for covering a second polarization different from or orthogonal to the first polarization (e.g., a second linear polarization such as a horizontal polarization). Antenna 30V may have a UTC PD 42 such as UTC PD 42V coupled between a corresponding pair of radiating element arms 36. Antenna 30H may have a UTC PD 42 such as UTC PD 42H coupled between a corresponding pair of radiating element arms 36 oriented non-parallel (e.g., orthogonal) to the radiating element arms 36 in antenna 30V. This may allow antennas 30V and 30H to transmit THF signals 32 with respective (orthogonal) polarizations and may allow antennas 30V and 30H to receive THF signals 32 with respective (orthogonal) polarizations.

To minimize space within device 10, antenna 30V may be vertically stacked over or under antenna 30H (e.g., where UTC PD 42V partially or completely overlaps UTC PD 42H). In this example, antennas 30V and 30H may both be formed on the same substrate such as a rigid or flexible printed circuit board. The substrate may include multiple stacked dielectric layers (e.g., layers of ceramic, epoxy, flexible printed circuit board material, rigid printed circuit board material, etc.). The radiating element arms 36 in antenna 30V may be formed on a separate layer of the substrate than the radiating element arms 36 in antenna 30H or the radiating element arms 36 in antenna 30V may be formed on the same layer of the substrate as the radiating element arms 36 in antenna 30H. UTC PD 42V may be formed on the same layer of the substrate as UTC PD 42H or UTC PD 42V may be formed on a separate layer of the substrate than UTC PD 42H. UTC PD 42V may be formed on the same layer of the substrate as the radiating element arms 36 in antenna 30V or may be formed on a separate layer of the substrate as the radiating element arms 36 in antenna 30V. UTC PD 42H may be formed on the same layer of the substrate as the radiating element arms 36 in antenna 30H or may be formed on a separate layer of the substrate as the radiating element arms 36 in antenna 30H.

Figure 5:
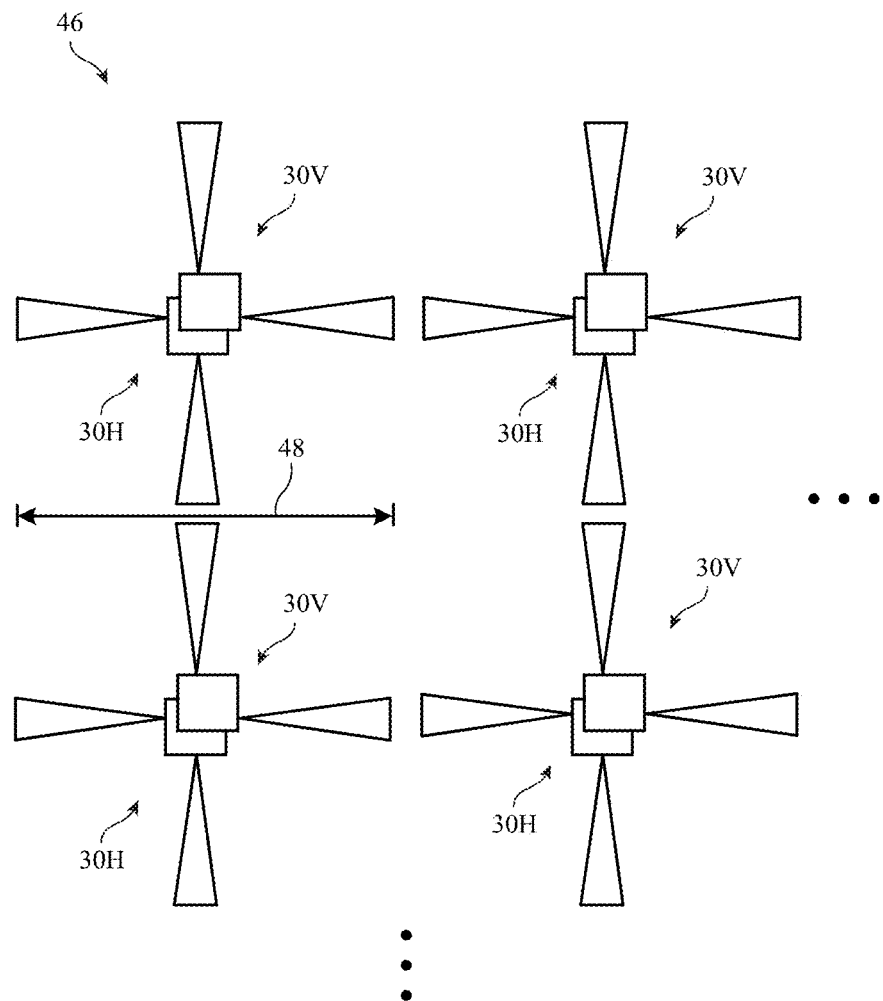
FIG. 5 is a top view showing how stacked antennas of the type shown in FIG. 4 may be integrated into a phased antenna array for conveying wireless signals at frequencies greater than about 100 GHz within a corresponding signal beam.

If desired, antennas 30 or antennas 30H and 30V of FIG. 4 may be integrated within a phased antenna array. FIG. 5 is a diagram showing one example of how antennas 30H and 30V may be integrated within a phased antenna array. As shown in FIG. 5, device 10 may include a phased antenna array 46 of stacked antennas 30H and 30V arranged in a rectangular grid of rows and columns. Each of the antennas in phased antenna array 46 may be formed on the same substrate. This is merely illustrative. In general, phased antenna array 46 (sometimes referred to as a phased array antenna) may include any desired number of antennas 30V and 30H (or non-stacked antennas 30) arranged in any desired pattern. Each of the antennas in phased antenna array 46 may be provided with a respective optical phase shift S (FIGS. 2 and 3) that configures the antennas to collectively transmit THF signals 32 and/or receive THF signals 34 that sum to form a signal beam of THF signals in a desired beam pointing direction. The beam pointing direction may be selected to point the signal beam towards external communications equipment, towards a desired external object, away from an external object, etc.

Phased antenna array 46 may occupy relatively little space within device 10. For example, each antenna 30V/30H may have a length 48 (e.g., as measured from the end of one radiating element arm to the opposing end of the opposite radiating element arm). Length 48 may be approximately equal to one-half the wavelength of THF signals 32 and 34. For example, length 48 may be as small as 0.5 mm or less.

Each UTC-PD 42 in phased antenna array 46 may occupy a lateral area of 100 square microns or less. This may allow phased antenna array 46 to occupy very little area within device 10, thereby allowing the phased antenna array to be integrated within different portions of device 10 while still allowing other space for device components. The examples of FIGS. 2-5 are merely illustrative and, in general, each antenna may have any desired antenna radiating element architecture.

Figure 6:
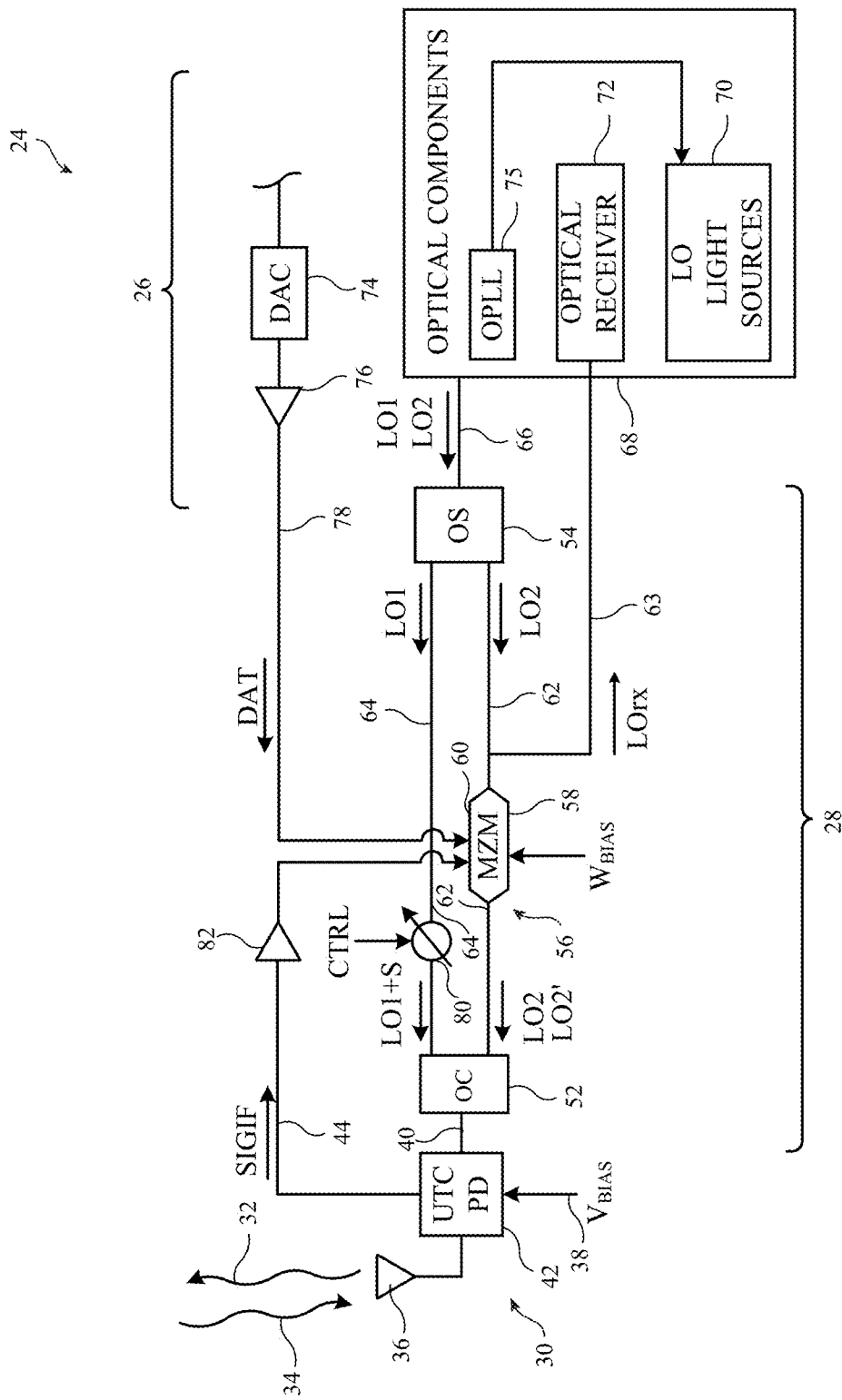
FIG. 6 is a circuit diagram of illustrative wireless circuitry having an antenna that transmits wireless signals at frequencies greater than about 100 GHz and that receives wireless signals at frequencies greater than about 100 GHz for conversion to intermediate frequencies and then to the optical domain in accordance with some embodiments.

FIG. 6 is a circuit diagram showing how a given antenna 30 and signal path 28 (FIG. 1) may be used to both transmit THF signals 32 and receive THF signals 34 based on optical local oscillator signals. In the example of FIG. 6, UTC PD 42 converts received THF signals 34 into intermediate frequency signals SIGIF that are then converted to the optical domain for recovering the wireless data from the received THF signals.

As shown in FIG. 6, wireless circuitry 24 may include transceiver circuitry 26 coupled to antenna 30 over signal path 28 (e.g., an optical signal path sometimes referred to herein as optical signal path 28). UTC PD 42 may be coupled between the radiating element arm(s) 36 of antenna 30 and signal path 28. Transceiver circuitry 26 may include optical components 68, amplifier circuitry such as power amplifier 76, and digital-to-analog converter (DAC) 74. Optical components 68 may include an optical receiver such as optical receiver 72 and optical local oscillator (LO) light sources (emitters) 70. LO light sources 70 may include two or more light sources (e.g., sources of electromagnetic energy, light, or light energy) such as laser light sources, laser diodes, optical phase locked loops, or other optical emitters that emit light (e.g., electromagnetic energy, light, or light energy that includes optical local oscillator signals LO1 and LO2) at respective wavelengths (e.g., visible, infrared, and/or ultraviolet wavelengths). If desired, LO light sources 70 may include a single light source and may include optical components for splitting the light emitted by the light source into different wavelengths. Signal path 28 may be coupled to optical components 68 over optical path 66. Optical path 66 may include one or more optical fibers and/or waveguides.

Signal path 28 may include an optical splitter such as optical splitter (OS) 54, optical paths such as optical path 64 and optical path 62, an optical combiner such as optical combiner (OC) 52, and optical path 40. Optical path 62 may be an optical fiber or waveguide. Optical path 64 may be an optical fiber or waveguide. Optical splitter 54 may have a first (e.g., input) port coupled to optical path 66, a second (e.g., output) port coupled to optical path 62, and a third (e.g., output) port coupled to optical path 64. Optical path 64 may couple optical splitter 54 to a first (e.g., input) port of optical combiner 52. Optical path 62 may couple optical splitter 54 to a second (e.g., input) port of optical combiner 52. Optical combiner 52 may have a third (e.g., output) port coupled to optical path 40. If desired, optical combiners 116 and 52 may be integrated into a single optical combiner or may otherwise be implemented as one or more optical combiners that combine one or more inputs onto optical path 132.

An optical phase shifter such as optical phase shifter 80 may be (optically) interposed on or along optical path 64. An optical modulator such as optical modulator 56 may be (optically) interposed on or along optical path 62. Optical modulator 56 may be, for example, a Mach-Zehnder modulator (MZM) and may therefore sometimes be referred to herein as MZM 56. MZM 56 includes a first optical arm (branch) 60 and a second optical arm (branch) 58 interposed in parallel along optical path 62. Propagating optical local oscillator signal LO2 along arms 60 and 58 of MZM 56 may, in the presence of a voltage signal applied to one or both arms, allow different optical phase shifts to be imparted on each arm before recombining the signal at the output of the MZM (e.g., where optical phase modulations produced on the arms are converted to intensity modulations at the output of MZM 56). When the voltage applied to MZM 56 includes wireless data, MZM 56 may modulate the wireless data onto optical local oscillator signal LO2. If desired, the phase shifting performed at MZM 56 may be used to perform beam forming/steering in addition to or instead of optical phase shifter 80. MZM 56 may receive one or more bias voltages $W_{BIAS}$ (sometimes referred to herein as bias signals $W_{BIAS}$) applied to one or both of arms 58 and 60. Control circuitry 14 (FIG. 1) may provide bias voltage $W_{BIAS}$ with different magnitudes to place MZM 56 into different operating modes (e.g., operating modes that suppress optical carrier signals, operating modes that do not suppress optical carrier signals, etc.).

Intermediate frequency signal path 44 may couple UTC PD 42 to MZM 56 (e.g., arm 60). An amplifier such as low noise amplifier 82 may be interposed on intermediate frequency signal path 44. Intermediate frequency signal path 44 may be used to pass intermediate frequency signals SIGIF from UTC PD 42 to MZM 56. DAC 74 may have an input coupled to up-conversion circuitry, modulator circuitry, and/or baseband circuitry in a transmitter of transceiver circuitry 26. DAC 74 may receive digital data to transmit over antenna 30 and may convert the digital data to the analog domain (e.g., as data DAT). DAC 74 may have an output coupled to transmit data path 78. Transmit data path 78 may couple DAC 74 to MZM 56 (e.g., arm 60). Each of the components along signal path 28 may allow the same antenna 30 to both transmit THF signals 32 and receive THF signals 34 (e.g., using the same components along signal path 28), thereby minimizing space and resource consumption within device 10.

LO light sources 70 may produce (emit) optical local oscillator signals LO1 and LO2 (e.g., at different wavelengths that are separated by the wavelength of THF signals 32/34). Optical components 68 may include lenses, waveguides, optical couplers, optical fibers, and/or other optical components that direct the emitted optical local oscillator signals LO1 and LO2 towards optical splitter 54 via optical path 66. Optical splitter 54 may split the optical signals on optical path 66 (e.g., by wavelength) to output optical local oscillator signal LO1 onto optical path 64 while outputting optical local oscillator signal LO2 onto optical path 62.

Control circuitry 14 (FIG. 1) may provide phase control signals CTRL to optical phase shifter 80. Phase control signals CTRL may control optical phase shifter 80 to apply optical phase shift S to the optical local oscillator signal LO1 on optical path 64. Phase shift S may be selected to steer a signal beam of THF signals 32/34 in a desired pointing direction. Optical phase shifter 80 may pass the phase-shifted optical local oscillator signal LO1 (denoted as LO1+S) to optical combiner 52. Signal beam steering is performed in the optical domain (e.g., using optical phase shifter 80) rather than in the THF domain because there are no satisfactory phase shifting circuit components that operate at frequencies as high as the frequencies of THF signals 32 and 34. Optical combiner 52 may receive optical local oscillator signal LO2 over optical path 62. Optical combiner 52 may combine optical local oscillator signals LO1 and LO2 onto optical path 40, which directs the optical local oscillator signals onto UTC PD 42 for use during signal transmission or reception.

During transmission of THF signals 32, DAC 74 may receive digital wireless data (e.g., data packets, frames, symbols, etc.) for transmission over THF signals 32. DAC 74 may convert the digital wireless data to the analog domain and may output (transmit) the data onto transmit data path 78 as data DAT (e.g., for transmission via antenna 30). Power amplifier 76 may amplify data DAT. Transmit data path 78 may pass data DAT to MZM 56 (e.g., arm 60). MZM 56 may modulate data DAT onto optical local oscillator signal LO2 to produce modulated optical local oscillator signal LO2' (e.g., an optical local oscillator signal at the frequency/wavelength of optical local oscillator signal LO2 but that is modulated to include the data identified by data DAT). Optical combiner 52 may combine optical local oscillator signal LO1 with modulated optical local oscillator signal LO2' at optical path 40.

Optical path 40 may illuminate UTC PD 42 with (using) optical local oscillator signal LO1 (e.g., with the phase shift S applied by optical phase shifter 80) and modulated optical local oscillator signal LO2'. Control circuitry 14 (FIG. 1) may apply a control signal $V_{BIAS}$ to UTC PD 42 that configures antenna 30 for the transmission of THF signals 32. UTC PD 42 may convert optical local oscillator signal LO1 and modulated optical local oscillator signal LO2' into antenna currents on radiating element arm(s) 36 at the frequency of THF signals 32 (e.g., while programmed for transmission using control signal $V_{BIAS}$). The antenna currents on radiating element arm(s) 36 may radiate THF signals 32. The frequency of THF signals 32 is given by the difference in frequency between optical local oscillator signal LO1 and modulated optical local oscillator signal LO2'. Control signals $V_{BIAS}$ may control UTC PD 42 to preserve the modulation from modulated optical local oscillator signal LO2' in the radiated THF signals 32. External equipment that receives THF signals 32 will thereby be able to extract data DAT from the THF signals 32 transmitted by antenna 30.

During reception of THF signals 34, MZM 56 does not modulate any data onto optical local oscillator signal LO2. Optical path 40 therefore illuminates UTC PD 42 with optical local oscillator signal LO1 (e.g., with phase shift S) and optical local oscillator signal LO2. Control circuitry 14 (FIG. 1) may apply a control signal $V_{BIAS}$ (e.g., a bias voltage) to UTC PD 42 that configures antenna 30 for the receipt of THF signals 32. UTC PD 42 may use optical local oscillator signals LO1 and LO2 to convert the received THF signals 34 into intermediate frequency signals SIGIF output onto intermediate frequency signal path 44 (e.g., while programmed for reception using bias voltage $V_{BIAS}$). Intermediate frequency signals SIGIF may include the modulated data from the received THF signals 34. Low noise amplifier 82 may amplify intermediate frequency signals SIGIF, which are then provided to MZM 56 (e.g., arm 60). MZM 56 may convert intermediate frequency signals SIGIF to the optical domain as optical signals LOrx (e.g., by modulating the data in intermediate frequency signals SIGIF onto one of the optical local oscillator signals) and may pass the optical signals to optical receiver 72 in optical components 68, as shown by arrow 63 (e.g., via optical paths 62 and 66 or other optical paths). Control circuitry 14 (FIG. 1) may use optical receiver 72 to convert optical signals LOrx to other formats and to recover (demodulate) the data carried by THF signals 34 from the optical signals. In this way, the same antenna 30 and signal path 28 may be used for both the transmission and reception of THF signals while also performing beam steering operations.

The example of FIG. 6 in which intermediate frequency signals SIGIF are converted to the optical domain is merely illustrative. If desired, transceiver circuitry 26 may receive and demodulate intermediate frequency signals SIGIF without first passing the signals to the optical domain. For example, transceiver circuitry 26 may include an analog-to-digital converter (ADC), intermediate frequency signal path 44 may be coupled to an input of the ADC rather than to MZM 56, and the ADC may convert intermediate frequency signals SIGIF to the digital domain. As another example, intermediate frequency signal path 44 may be omitted and control signals $V_{BIAS}$ may control UTC PD 42 to directly sample THF signals 34 with optical local oscillator signals LO1 and LO2 to the optical domain. As an example, UTC PD 42 may use the received THF signals 34 and control signals $V_{BIAS}$ to produce an optical signal on optical path 40. The optical signal may have an optical carrier with sidebands that are separated from the optical carrier by a fixed frequency offset (e.g., 30-100 GHz, 60 GHz, 50-70 GHz, 10-100 GHz, etc.). The sidebands may be used to carry the modulated data from the received THF signals 34. Signal path 28 may direct (propagate) the optical signal produced by UTC PD 42 to optical receiver 72 in optical components 68 (e.g., via optical paths 40, 64, 62, 66, 63, and/or other optical paths). Control circuitry 14 (FIG. 1) may use optical receiver 72 to convert the optical signal to other formats and to recover (demodulate) the data carried by THF signals 34 from the optical signal (e.g., from the sidebands of the optical signal).

If desired, optical components 68 may include clocking circuitry such as clocking (CLK) circuitry 75 (sometimes referred to herein as clock circuitry 75 or clock generation circuitry 75). Clocking circuitry 75 may include one or more electro-optical phase-locked loops (OPLLs), frequency locked loops (FLLs), and self-injection locked (locking) loops. As shown in FIG. 6, clocking circuitry 75 may be used to control and clock LO light sources 70 and/or to clock any other desired hardware in device 10 (e.g., clocking circuitry 75 need not be located in transceiver 26 and may, in general, be located elsewhere in device 10). LO light sources 70 may, for example, generate optical LO signals that are phase-locked, self-injection locked, and optionally frequency-locked with respect to each other using clocking circuitry 75.

Figure 7:
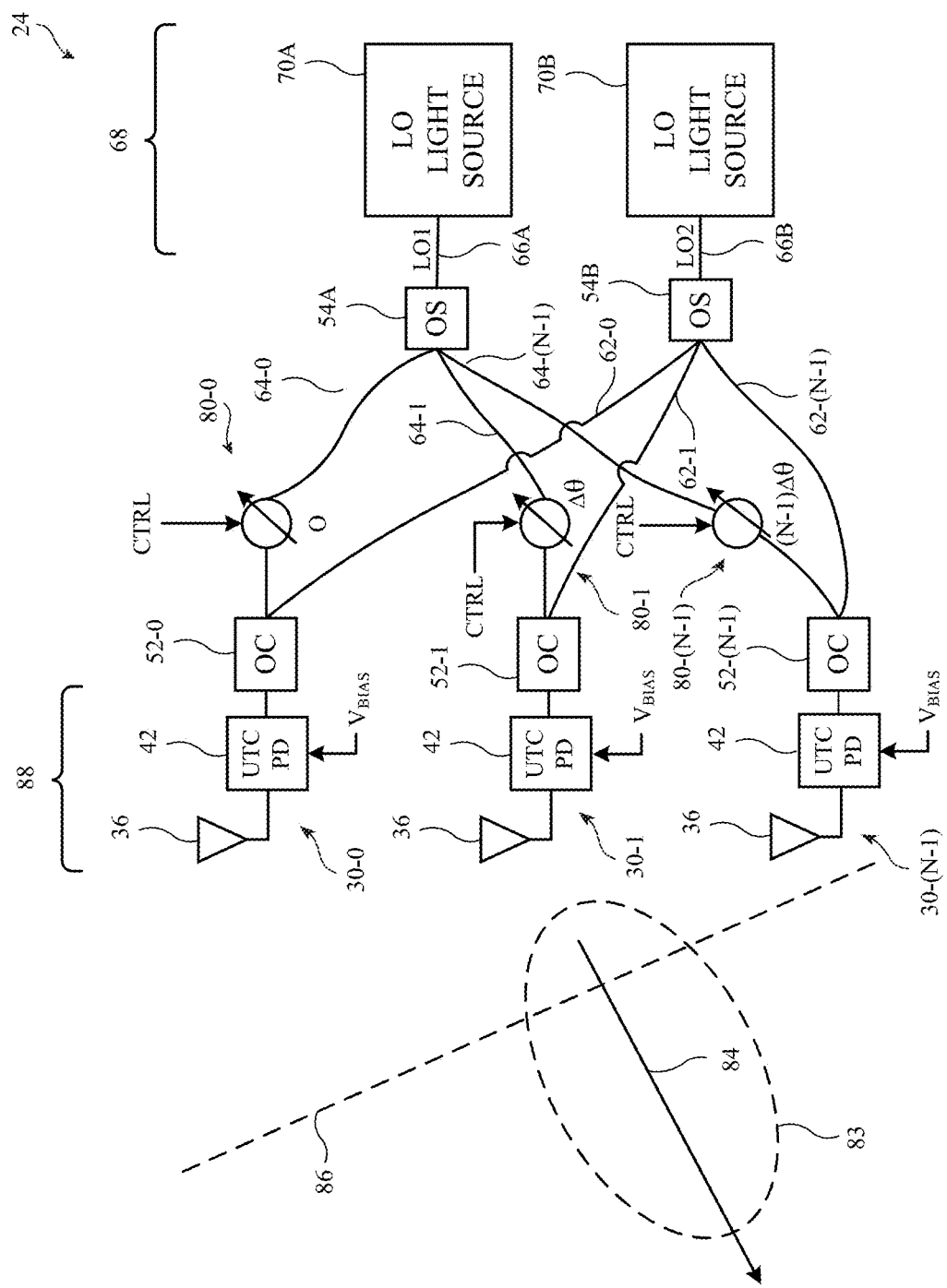
FIG. 7 is a circuit diagram of an illustrative phased antenna array that conveys wireless signals at frequencies greater than about 100 GHz within a corresponding signal beam in accordance with some embodiments.

FIG. 7 is a circuit diagram showing one example of how multiple antennas 30 may be integrated into a phased antenna array 88 that conveys THF signals over a corresponding signal beam. In the example of FIG. 7, MZMs 56, intermediate frequency signal paths 44, data paths 78, and optical receiver 72 of FIG. 6 have been omitted for the sake of clarity. Each of the antennas in phased antenna array 88 may alternatively sample received THF signals directly into the optical domain or may pass intermediate frequency signals SIGIF to ADCs in transceiver circuitry 26.

As shown in FIG. 7, phased antenna array 88 includes N antennas 30 such as a first antenna 30-0, a second antenna 30-1, and an Nth antenna 30-(N−1). Each of the antennas 30 in phased antenna array 88 may be coupled to optical components 68 via a respective optical signal path (e.g., optical signal path 28 of FIG. 6). Each of the N signal paths may include a respective optical combiner 52 coupled to the UTC PD 42 of the corresponding antenna 30 (e.g., the UTC PD 42 in antenna 30-0 may be coupled to optical combiner 52-0, the UTC PD 42 in antenna 30-1 may be coupled to optical combiner 52-1, the UTC PD 42 in antenna 30-(N−1) may be coupled to optical combiner 52-(N−1), etc.). Each of the N signal paths may also include a respective optical path 62 and a respective optical path 64 coupled to the corresponding optical combiner 52 (e.g., optical paths 64-0 and 62-0 may be coupled to optical combiner 52-0, optical paths 64-1 and 62-1 may be coupled to optical combiner 52-1, optical paths 64-(N−1) and 62-(N−1) may be coupled to optical combiner 52-(N−1), etc.).

Optical components 68 may include LO light sources 70 such as a first LO light source 70A and a second LO light source 70B. The optical signal paths for each of the antennas 30 in phased antenna array 88 may share one or more optical splitters 54 such as a first optical splitter 54A and a second optical splitter 54B. LO light source 70A may generate (e.g., produce, emit, transmit, etc.) first optical local oscillator signal LO1 and may provide first optical local oscillator signal LO1 to optical splitter 54A via optical path 66A. Optical splitter 54A may distribute first optical local oscillator signal LO1 to each of the UTC PDs 42 in phased antenna array 88 over optical paths 64 (e.g., optical paths 64-0, 64-1, 64-(N−1), etc.). Similarly, LO light source 70B may generate (e.g., produce, emit, transmit, etc.) second optical local oscillator signal LO2 and may provide second optical local oscillator signal LO2 to optical splitter 54B via optical path 66B. Optical splitter 54B may distribute second optical local oscillator signal LO2 to each of the UTC PDs 42 in phased antenna array 88 over optical paths 62 (e.g., optical paths 62-0, 62-1, 62-(N−1), etc.).

A respective optical phase shifter 80 may be interposed along (on) each optical path 64 (e.g., a first optical phase shifter 80-0 may be interposed along optical path 64-0, a second optical phase shifter 80-1 may be interposed along optical path 64-1, an Nth optical phase shifter 80-(N−1) may be interposed along optical path 64-(N−1), etc.). Each optical phase shifter 80 may receive a control signal CTRL that controls the phase S provided to optical local oscillator signal LO1 by that optical phase shifter (e.g., first optical phase shifter 80-0 may impart an optical phase shift of zero degrees/radians to the optical local oscillator signal LO1 provided to antenna 30-0, second optical phase shifter 80-1 may impart an optical phase shift of $\Delta\phi$ to the optical local oscillator signal LO1 provided to antenna 30-1, Nth optical phase shifter 80-(N−1) may impart an optical phase shift of $(N-1)\Delta\phi$ to the optical local oscillator signal LO1 provided to antenna 30-(N−1), etc.). By adjusting the phase S imparted by each of the N optical phase shifters 80, control circuitry 14 (FIG. 1) may control each of the antennas 30 in phased antenna array 88 to transmit THF signals 32 and/or to receive THF signals 34 within a formed signal beam 83. Signal beam 83 may be oriented in a particular beam pointing direction (angle) 84 (e.g., the direction of peak gain of signal beam 83). The THF signals conveyed by phased antenna array 88 may have wavefronts 86 that are orthogonal to beam pointing direction 84. Control circuitry 14 may adjust beam pointing direction 84 over time to point towards external communications equipment or an external object or to point away from external objects, as examples.

It may be desirable for device 10 to be able to convey THF signals 32 and 34 with different numbers of users (e.g., external devices such as additional devices 10), data streams, signal qualities, and/or spatial directions for (e.g., for performing communication or spatial ranging). Different users may be spatially separated, may be communicating at different frequencies, or may require different quality services for various applications. Device 10 may utilize time slot, spatial direction, and/or polarization diversity to dynamically serve one or more different users (external devices) having different communications requirements over time. It may also be desirable for device 10 to utilize flexible frequency allocation to dynamically serve one or more different users having different communications requirements over time.

Device 10 may perform flexible resource allocation in frequency space by transmitting THF signals 32 that include orthogonal frequency-division multiplexing (OFDM) waveforms. For some communications protocols such as 5G and 6G protocols, relatively large bandwidths may be required to support the OFDM waveforms for transmission to single receiving device or several receiving devices (users). On the receiver side, sophisticated beacon extraction mechanisms, broadcast/control channels, and/or reference symbols may be required to keep receiver effort minimal. In practice, it can be difficult for electrical components to produce OFDM waveforms with the required levels of flexibility over such wide bandwidths. To mitigate these issues, wireless circuitry 24 on device 10 may generate OFDM waveforms for transmitted THF signals 32 using hybrid electro-optical processing (e.g., using aggregate optical OFDM symbols generated based on electrical OFDM symbols).

Figure 8:
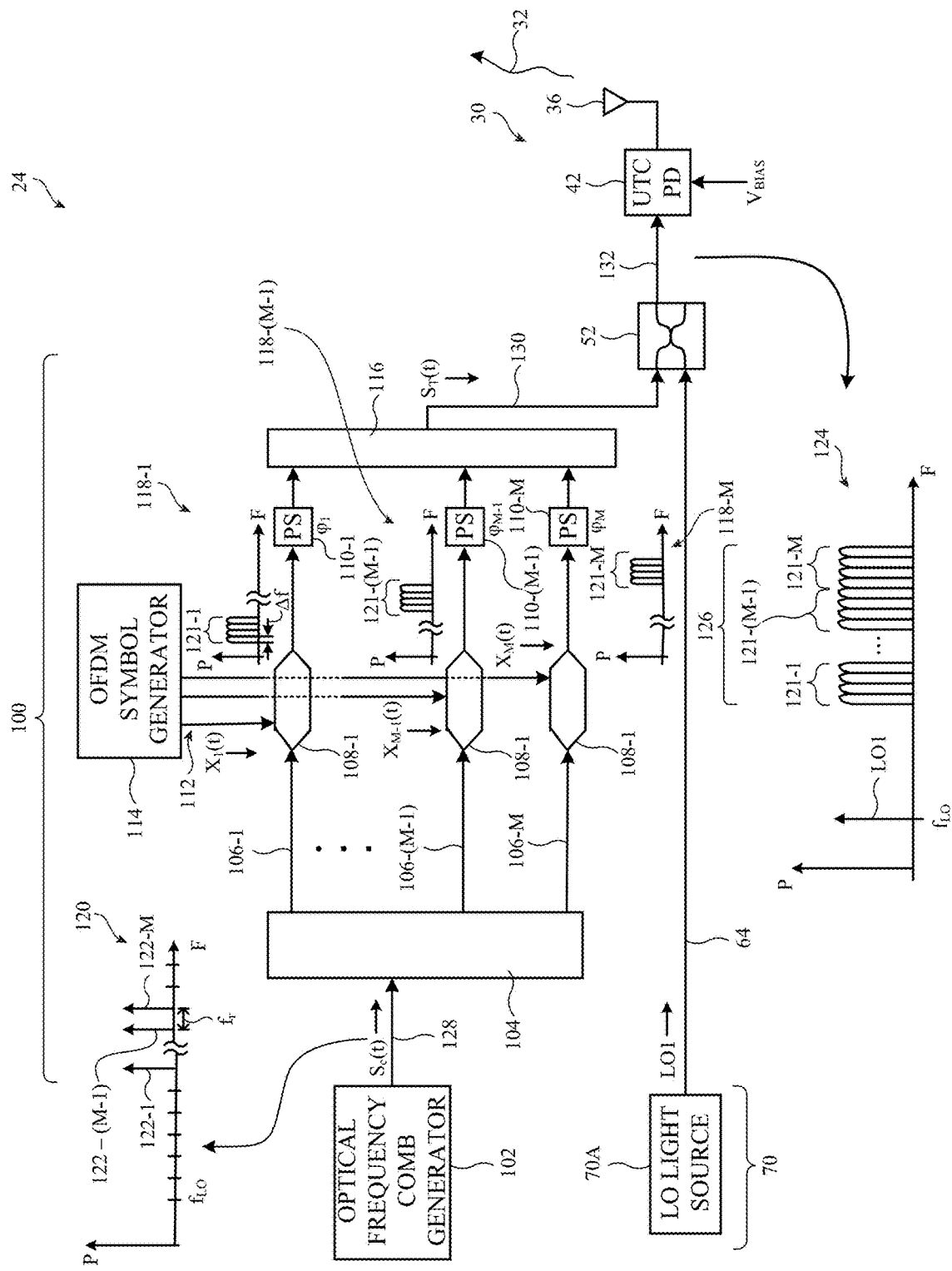
FIG. 8 is a circuit diagram of illustrative wireless circuitry that generates an aggregate optical orthogonal frequency division multiplexing (OFDM) symbol for transmission of wireless signals at frequencies greater than about 100 GHz in accordance with some embodiments.

FIG. 8 is a circuit diagram showing one example of wireless circuitry 24 that generates OFDM waveforms for transmitted THF signals 32 using hybrid electro-optical processing. The example of FIG. 8 illustrates the transmit process for a single antenna 30. Similar circuitry may be used for signal transmission across multiple antennas 30 (e.g., within a phased antenna array such as phased antenna array 88 of FIG. 7).

As shown in FIG. 8, wireless circuitry 24 may include LO light sources 70 coupled to a given antenna 30 via a corresponding optical combiner (OC) 52 and optical paths 100 and 64. LO light sources 70 may include at least LO light source 70A and an optical frequency comb signal generator such as optical frequency comb generator 102 (e.g., optical frequency comb generator 102 may take the place of LO light source 70B of FIG. 7). LO light source 70A may be coupled to a first input of OC 52 over optical path 64. LO light source 70A may output optical LO signal LO1 onto optical path 64. Optical frequency comb generator 102 may be coupled to a second input of OC 52 over optical path 100. OC 52 may have an output coupled to the photodiode 42 in antenna 30 over optical path 132.

Optical path 100 may be used to produce OFDM symbols (e.g., data) on optical signals for transmission over antenna 30 (e.g., optical path 100 may take the place of optical path 62 of FIGS. 6 and 7). Optical path 100 may include an optical demultiplexer such as optical demultiplexer 104 and an optical combiner (OC) such as optical combiner 116. Optical demultiplexer 104 may have an input coupled to the output of optical frequency comb generator 102 over optical path 128. OC 116 may have an output coupled to the second input of OC 52 over optical path 130. Optical demultiplexer 104 may have M different outputs. OC 116 may have M different inputs. Optical demultiplexer 104 may switch, demultiplex, or otherwise split a single optical signal at its input by wavelength or frequency into optical signals of different wavelengths or frequencies at each of its outputs (e.g., optical demultiplexer 104 may be a wavelength-selective switch or wavelength-based demultiplexer). OC 116 may combine optical signals at its inputs into a single optical signal at its output.

Each of the M outputs of optical demultiplexer 104 may be coupled to a corresponding one of the M inputs of OC 116 over a respective optical path 106 (e.g., a first optical path 106-1 may couple a first output of optical demultiplexer 104 to a first input of OC 116, an (M−1)th optical path 106-(M−1) may couple an (M−1)th output of optical demultiplexer 104 to an (M−1)th input of OC 116, an Mth optical path 106-M may couple an Mth output of optical demultiplexer 104 to an Mth input of OC 116, etc.). Optical paths 106, 128, 130, 124, and 132 may each include optical fibers, optical waveguides, lenses, optical couplers, optical splitters, optical combiners, and/or any other desired components that propagate optical signals.

Each optical path 106 may have a respective electro-optical modulator (mixer) such as electro-optical modulator 108 disposed thereon (e.g., a first electro-optical modulator 108 may be disposed on optical path 106-1, an (M−1)th electro-optical modulator 108 may be disposed on optical path 106-(M−1), an Mth electro-optical modulator 108 may be disposed on optical path 106-M, etc.). Electro-optical modulators 108 may be MZMs, I/Q modulators, or any other desired electro-optical mixers (e.g., MZM 56 of FIG. 6).

If desired, each optical path 106 may have a respective optical phase shifter (PS) 110 disposed thereon (e.g., optically coupled in series between the corresponding electro-optical modulator 108 and OC 116). For example, a first optical phase shifter 110-1 may be disposed on optical path 106-1, an (M−1)th optical phase shifter 110-(M−1) may be disposed on optical path 106-(M−1), an Mth optical phase shifter 110-M may be disposed on optical path 106-M, etc. If desired, electro-optical modulators 108, optical phase shifters 110, and/or any other desired optical or electro-optical components described herein may be implemented using plasmonics technology (e.g., electro-optical modulators 108 may be plasmonic electro-optical modulators, optical phase shifters 110 may be plasmonic phase shifters, etc.).

Optical phase shifters 110 may apply different optical phase shifts 4 to the optical signals on optical paths 106 (e.g., optical phase shifter 110-1 may apply optical phase shift 41, optical phase shifter 110-(M−1) may apply optical phase shift Ow), optical phase shifter 110-M may apply optical phase shift Om, etc.). If desired, optical phase shifters 110 may receive control signals such as control signals CTRL of FIGS. 6 and 7 that change the optical phase shifts applied by optical phase shifters 110 over time (e.g., optical phase shifters 110 may replace optical phase shifters 80 of FIGS. 6 and 7). Optical phase shifters 110 may be located elsewhere in wireless circuitry 24 or may be omitted if desired.

Wireless circuitry 24 may include an OFDM symbol generator such as OFDM symbol generator 114. OFDM symbol generator 114 may include electrical hardware such as digital circuitry, analog circuitry, and converter circuitry that converts signals between digital and analog domains. OFDM symbol generator 114 may have an output coupled to the electro-optical modulators 108 on optical paths 106 over transmit data paths 112. Transmit data paths 112 may, for example, be coupled to one or more electrodes on electro-optical modulators 108. Transmit data paths 112 may convey electrical signals (e.g., electrical symbols or data) to electro-optical modulators 108. Electro-optical modulators 108 may modulate the electrical signals onto optical signals on optical paths 106 for transmission via antenna 30 using THF signals 32.

Optical frequency comb generator 102 may include one or more light sources and/or other light emitters that generate an optical frequency comb signal such as frequency comb signal $S_C(t)$ (e.g., as a function of time t). Frequency comb signal $S_C(t)$ may include an optical LO signal and a comb of optical signals that are offset in frequency (wavelength) from the optical LO signal. A comb of optical signals (sometimes referred to as an optical frequency comb or a frequency comb) is a set of evenly-spaced spectral lines (carriers) in the frequency domain at optical frequencies (e.g., where each carrier or subcarrier forms a respective "tooth" of the comb). The optical frequency comb may, for example, include a total of M evenly-spaced carriers. Each carrier has a respective carrier frequency given by the formula $f_n = n*f_r + f_0$, where $f_r$ is the frequency of the THF signals using that carrier at carrier frequency $f_n$ and $f_0$ is an offset frequency from 0 Hz (DC). Frequency $f_r$ also corresponds to the difference in frequency between adjacent carriers (e.g., the line spacing of the comb). Frequency $f_r$ may sometimes be referred to herein as comb tooth spacing $f_r$, repetition rate $f_r$, an offset frequency, or a frequency gap.

The phases of each of the M carriers in the optical frequency comb may be the same (e.g., all the carriers are phase-locked with respect to each other). In the time domain, the optical frequency comb corresponds to a train of optical pulses and frequency $f_r$ relates to the inverse of the period of the pulse train (e.g., repetition rate). Offset frequency $f_0$ indicates that the oscillation frequencies of the spectral lines in the optical frequency comb are not necessarily an integer multiple of the repetition rate. Since offset frequency $f_0$ is most generally independent of frequency $f_r$, there are two degrees of freedom in an optical pulse train that define the absolute position of the lines in the frequency domain.

The origin of the offset frequency $f_0$ may depend on the comb generation architecture implemented in optical frequency comb generator 102. Optical frequency comb generator 102 may include, for example, mode-locked lasers. In these implementations, the origin of the offset frequency $f_0$ may depend on the relation between the group and phase velocity in the resonating cavity. In implementations where optical frequency comb generator 102 generates frequency comb signals as modulation spectra around a central frequency, the origin of the offset frequency $f_0$ may depend on the absolute value of the central frequency. For these types of frequency comb signals, the central frequency may itself form offset frequency $f_0$ to define the absolute position of the comb. These types of frequency combs may exhibit phase locking between spectral lines. If desired, optical frequency comb generator 102 may include one or more lasers that emit an optical LO signal and/or one or more other optical signals and one or more resonant cavities that produce the optical frequency comb using the optical LO signal and/or the one or more other optical signals.

Plot 120 of FIG. 8 shows one example of the optical frequency comb in frequency comb signal $S_C(t)$, in units of power P as a function of frequency F. As shown in plot 120, frequency comb signal $S_C(t)$ may include a M uniformly-spaced optical carriers (spectral lines) 122 (e.g., a first carrier 122-1, an (M−1)th carrier 122-(M−1), an Mth carrier 122-M, etc.). The M carriers 122 may sometimes also be referred to herein collectively as an optical frequency comb. In general, M may be any desired integer greater than or equal to one.

Each carrier 122 may be at a respective carrier frequency and may be separated from one or two adjacent carriers 122 by frequency $f_r$. Carriers 122 may sometimes also be referred to herein as optical carriers 122, frequency comb carriers 122, frequency comb components 122, spectral peaks 122, lines 122, or optical tones 122 (e.g., carriers 122 may form a comb-shaped pattern of optical tones each at a respective carrier frequency and separated from one or two other optical tones in the sets by the same frequency $f_r$). Frequency comb signal $S_C(t)$ may, for example, be defined analytically in the time domain by equation 1.

$$S_C(t) = \sum_{m=0}^{M-1} e^{j 2\pi (fc,0 + m \cdot B) t} \quad (1)$$

In equation 1, j is the square root of −1, B is the carrier spacing (e.g., $f_r$), and $f_{c,0}$ is the base carrier frequency.

Optical frequency comb generator 102 may transmit (output) frequency comb signal $S_C(t)$ to optical demultiplexer 104 over optical path 128. Optical demultiplexer 104 may divide (e.g., split or demultiplex) frequency comb signal $S_C(t)$ by wavelength (frequency) to output a respective one of the M carriers 122 onto each optical path 106 (e.g., optical demultiplexer 104 may output optical signals of the wavelength of a different respective one of the M carriers in frequency comb signal $S_C(t)$ onto each optical path 106). For example, optical demultiplexer 104 may output (couple) carrier 122-1 from frequency comb signal $S_C(t)$ onto optical path 106-1 (e.g., while filtering, blocking, or otherwise preventing the other carriers 122 in frequency comb signal $S_C(t)$ from passing to optical path 106-1), may output (couple) carrier 122-(M−1) from frequency comb signal $S_C(t)$ onto optical path 106-(M−1) (e.g., while filtering, blocking, or otherwise preventing the other carriers 122 in frequency comb signal $S_C(t)$ from passing to optical path 106-(M−1)), may output carrier 122-M from frequency comb signal $S_C(t)$ onto optical path 106-(M) (e.g., while filtering, blocking, or otherwise preventing the other carriers 122 in frequency comb signal $S_C(t)$ from passing to optical path 106-M), etc.

Wireless circuitry 24 may modulate electrical OFDM symbols onto frequency comb signal $S_C(t)$ to produce an optical OFDM waveform for transmission (e.g., optical OFDM symbols). During signal transmission, OFDM symbol generator 114 may generate a set of M different electrical OFDM symbols $x_m(t)$ (e.g., where m=1, . . . , (M−1), M), which form the baseband transmit signal for transmission over antenna 30. In other words, OFDM symbol generator 114 may concurrently generate a different electrical OFDM symbol $x_m(t)$ for each of the M carriers in frequency comb signal $S_C(t)$ and for each of the M optical paths 106.

The electrical OFDM symbols may be used to convey any desired data for transmission to one or more external devices and/or may include symbols that are used for performing spatial ranging. Electrical OFDM symbols $x_m(t)$ may be output by OFDM symbol generator 114 as complex time signals (e.g., analog baseband signals). OFDM symbol generator 114 may include any desired symbol generation circuitry such as digital-to-analog converters (DACs) and fast Fourier transform (FFT) circuits that generate electrical OFDM symbols $x_m(t)$. There may, for example, be M FFT circuits in OFDM symbol generator 114 (e.g., where each FFT circuit generates a respective electrical OFDM symbol in the time domain).

OFDM symbol generator 114 may generate each OFDM symbol $x_m(t)$ to include N different subcarriers (in frequency space). N may be any desired integer greater than or equal to one. In the example of FIG. 8, each electrical OFDM symbol $x_m(t)$ includes N=4 different subcarriers. Each electrical OFDM symbol $x_m(t)$ may have a temporal length (duration) $T_0$. If desired, a cyclic prefix (CP) may be appended to the beginning of each electrical OFDM symbol $x_m(t)$. The CP may have a temporal length (duration) $T_{CP}$. The CP may help to prevent inter-symbol interference (ISI), for example. The CP may be electrically added by OFDM symbol generator 114 (e.g., in the digital domain prior to digital-to-analog conversion in OFDM symbol generator 114), as one example. The addition of the CP is not shown in FIG. 8 and is not described in the equations herein for the sake of simplicity and because the CP is removed at the receiving device prior to further processing. Each electrical OFDM symbol $x_m(t)$ (e.g., the analog baseband signal) may be described by equation 2, for example.

$$x_m(t) = \sum_{n=0}^{N-1} X_{n,m} \cdot e^{j2\pi\Delta f} \cdot rect\left(\frac{t-T}{T}\right) \quad (2)$$

In equation 2, rect( ) is the pulse shape function (which may be chosen differently if desired), $T=T_0+T_{CP}$ (e.g., the duration of one OFDM symbol with its CP), $\Delta f=1/T_0=B/N$ (e.g., the subcarrier spacing between the N subcarriers), and $X_{n,m}$ is the complex modulation alphabet used (e.g., QPSK). $X_{n,m}$ also holds the payload data for the transmitted signals, as well as any pilot symbols required to recover the information on the receiver side if required. Thus, for a given first electrical symbol and a second electrical symbol each including multiple subcarriers, where the first electrical symbol is modulated onto a first carrier and the second electrical symbol is modulated onto a second carrier, the first and second carriers may be separated by m times the modulation bandwidth B. The phase progression of one carrier may be m times modulation bandwidth B times time t faster than the other. The first and second electrical symbols may be bandwidth limited to bandwidth B or, if not bandwidth limited to bandwidth B, may have spectral sidelobes with zeros at the corresponding maxima of the other symbol.

OFDM symbol generator 114 may provide a respective one of the M different electrical OFDM symbols $x_m(t)$ to each electro-optical modulator 108 over transmit data paths 112 (e.g., as electrical signals provided to control terminals or electrodes of the electro-optical modulators 108). For example, OFDM symbol generator 114 may provide a first electrical OFDM symbol $x_1(t)$ to electro-optical modulator 108-1, may provide an (M−1)th electrical OFDM symbol $x_{M-1}(t)$ to electro-optical modulator 108-(M−1), may provide an Mth electrical OFDM symbol $x_M(t)$ to electro-optical modulator 108-M, etc.

Each electro-optical modulator 108 may modulate (mix) the respective carrier 122 received over its optical path 106 with the corresponding electrical OFDM symbol $x_m(t)$ received from OFDM symbol generator 114 to generate a corresponding optical OFDM symbol 121 (e.g., an optical signal that carriers the OFDM symbol specified by the corresponding electrical OFDM symbol $x_m(t)$). Plots 118 of FIG. 8 illustrate the M different optical OFDM symbols 121 generated by electro-optical modulators 108 in units of power as a function of frequency. For example, electro-optical modulator 108-1 may mix electrical OFDM symbol $x_1(t)$ with the carrier 122-1 of frequency comb signal $S_C(t)$ received over optical path 106-1 to generate a first optical OFDM symbol 121-1, as illustrated by plot 118-1, electro-optical modulator 108-(M−1) may mix electrical OFDM symbol $x_{M-1}(t)$ with the carrier 122-(M−1) of frequency comb signal $S_C(t)$ received over optical path 106-(M−1) to generate an (M−1)th optical OFDM symbol 121-(M−1), as illustrated by plot 118-(M−1), electro-optical modulator 108-M may mix electrical OFDM symbol $x_M(t)$ with the carrier 122-M of frequency comb signal $S_C(t)$ received over optical path 106-M to generate an Mth optical OFDM symbol 121-M, as illustrated by plot 118-M, etc.

Each optical OFDM symbol 121 includes the N subcarriers (e.g., the data from the N subcarriers) from its corresponding electrical OFDM symbol $x_m(t)$ modulated onto a different respective subcarrier frequency around the carrier frequency of the corresponding carrier 122 of frequency comb signal $S_C(t)$. Each subcarrier is separated in frequency from one or two adjacent subcarriers of its optical OFDM symbol 121 by subcarrier spacing $\Delta f$. In the example of FIG. 8, as shown by plots 118, each optical OFDM symbol 121 includes N=4 modulated subcarriers (e.g., a rectangular signal in time or a sinc function in frequency) that are stacked together in frequency on the corresponding optical path 106, where each OFDM symbol 121 is at a different one of the M carrier frequencies.

Optical combiner 116 may receive the M OFDM symbols 121 produced by electro-optical modulators 108. Optical combiner 116 may combine (e.g., add or aggregate) each of the M optical OFDM symbols 121 together to form (generate) optical signal $S_T(t)$ on optical path 130. Optical combiner 52 may combine optical signal $S_T(t)$ with the optical LO signal LO1 on optical path 64 to output an optical signal (e.g., a combined optical signal) on optical path 132, which is illustrated by plot 124 in units of power as a function of frequency. As shown in plot 124, the optical signal output onto optical path 132 includes each of the M optical OFDM symbols 121 aggregated (stacked) together in frequency (e.g., optical signal $S_T(t)$) and includes optical local oscillator signal LO1 at frequency $f_{LO}$. The aggregated M optical OFDM symbols 121 may sometimes be referred to herein as aggregate optical OFDM symbol 126, combined optical OFDM symbol 126, or super-OFDM symbol 126.

Aggregate optical OFDM symbol 126 thus has M×N total subcarriers distributed (allocated) in frequency for conveying the wireless data desired for transmission. Optical signal $S_T(t)$, which carries aggregate optical OFDM symbol 126, may be described analytically by equation 3 (e.g., the aggregation/combination of optical OFDM symbols 121 as produced by modulating the M carriers 122 from frequency comb signal $S_C(t)$ with corresponding electrical OFDM symbols $x_m(t)$ each having N subcarriers).

$$S_T(t) = \sum_{m=0}^{M-1} \sum_{n=0}^{N-1} X_{n,m} \cdot e^{j2\pi\Delta f} \cdot rect\left(\frac{t-T}{T}\right) \cdot e^{j2\pi(f_{c,0}+m\cdot B)t} \quad (3)$$

As shown by equation 3, optical path 100 produces a single optical OFDM symbol (i.e., aggregated optical OFDM symbol 126) with M×N subcarriers generated from M electrical OFDM symbols $x_m(t)$ (e.g., since different carriers of the optical frequency comb are locked as shown by equation 1). Aggregate optical OFDM symbol 126 has a very wide total bandwidth $B_{TOT}$ that is equal to B*M (e.g., as high as 20-25 GHz or higher). Bandwidth $B_{TOT}$ is much larger than would be supported by electrical hardware. The electro-optical implementation of optical path 100 may therefore allow for production of a single aggregate optical OFDM symbol having bandwidth $B_{TOT}$, which would otherwise be too large to be produced using purely electrical hardware.

Optical path 132 may illuminate photodiode 42 using the optical signal shown by plot 124 to produce THF currents that are radiated by antenna resonating element 36 as THF signals 32. The frequencies of the THF signals are given by the differences between the frequency of each of the M×N subcarriers in aggregate optical OFDM symbol 126 and frequency $f_{LO}$ of optical LO signal LO1 (e.g., THF signals 32 may carry different respective data using the M×N different subcarriers of aggregate optical OFDM symbol 126). In implementations where the CP is not added to the OFDM symbols in the electrical domain (e.g., by OFDM symbol generator 114), the CP may be added to aggregate optical OFDM symbol 126 in the optical domain (e.g., using a wave grating router or other components that operate on the optical signal after optical signal $S_T(t)$ has been combined with optical LO signal LO1).

Figure 9:
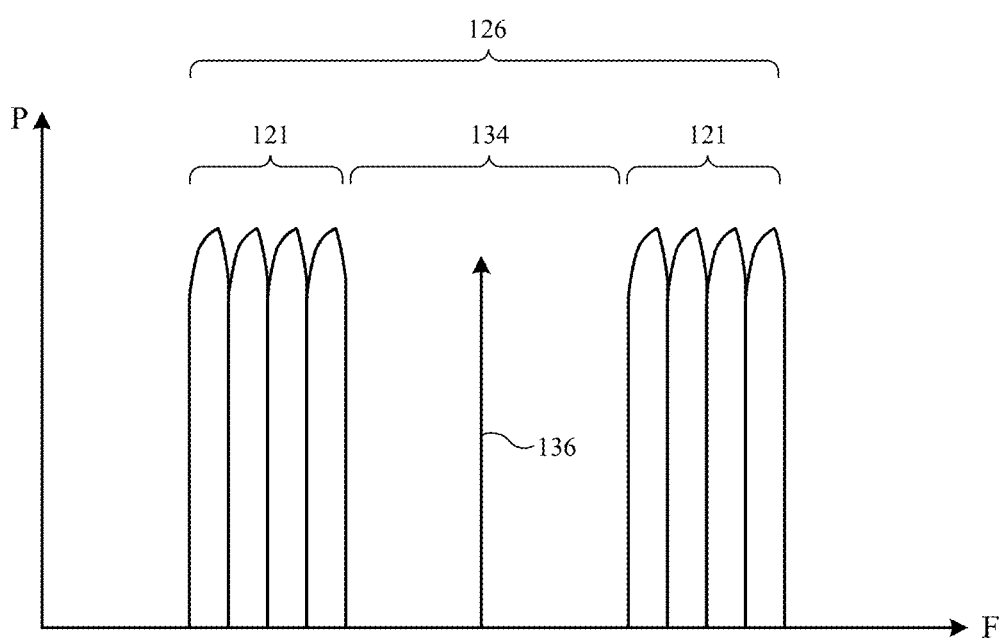
FIG. 9 is a plot showing how a set of subcarriers of an aggregate optical OFDM symbol can be suppressed to accommodate an additional signal in accordance with some embodiments.

As described above, $X_{m,n}$ (equations 2 and 3) contains the complex modulation alphabet, which may be payload data as well as pilot symbols. In contrast to these modulated pilot symbols, if desired, an unmodulated pilot tone may be added close to the modulation spectrum or within the modulation spectrum (e.g., by nulling a set of OFDM subcarriers). For example, as shown in the plot of FIG. 9, a set 134 of the subcarriers in aggregate optical OFDM symbol 126 may be nulled, zeroed, or filtered out (e.g., using an optical band stop filter or other filter structures).

Set 134 may include any desired number of subcarriers (e.g., from one or more of the optical OFDM symbols 121 in aggregate optical OFDM symbol 126). An additional (unmodulated) signal 136 (e.g., a single tone or sin wave) may be added to aggregate optical OFDM symbol 126 at one of the frequencies of set 134 prior to illuminating photodiode 42 with the aggregate optical OFDM symbol 126. Signal 136 may be a pilot signal, a beacon signal, a synchronization signal (e.g., a signal for use by the receiver device to synchronize with device 10), a reference signal, or any other desired control signal. Signal 136 may be configured to have low phase noise and low interference from the other allocated subcarriers (e.g., by providing sufficient space in frequency between signal 136 and the other allocated subcarriers).

The modulation of aggregate optical OFDM symbol 126 may allow for individual modulation alphabet down to subcarrier. In the electrical domain, OFDM and single-carrier modulation in the form of M-ary phase shift keying (PSK) (e.g., M-PSK), M-ary quadrature amplitude modulation (M-QAM), amplitude/intensity modulation or differential coherent modulation (e.g., D-8PSK or D-QAM) may be used on each optical carrier. However, these single-carrier modulations may be degraded by optical CP addition.

Aggregate optical OFDM symbol 126 may be used to convey communications data to one or more different external devices such as other devices 10. Additionally or alternatively, aggregate optical OFDM symbol 126 may be used as a radar signal for performing spatial ranging (e.g., an OFDM radar symbol). The radar signal may, if desired, be a continuous wave such as a chirp signal. In implementations where individual subcarriers with tones are inserted, this may allow for phase-based ranging. Here, the frequency and phase-locking of all subcarriers will allow for accurate phase dependency.

Figure 10:
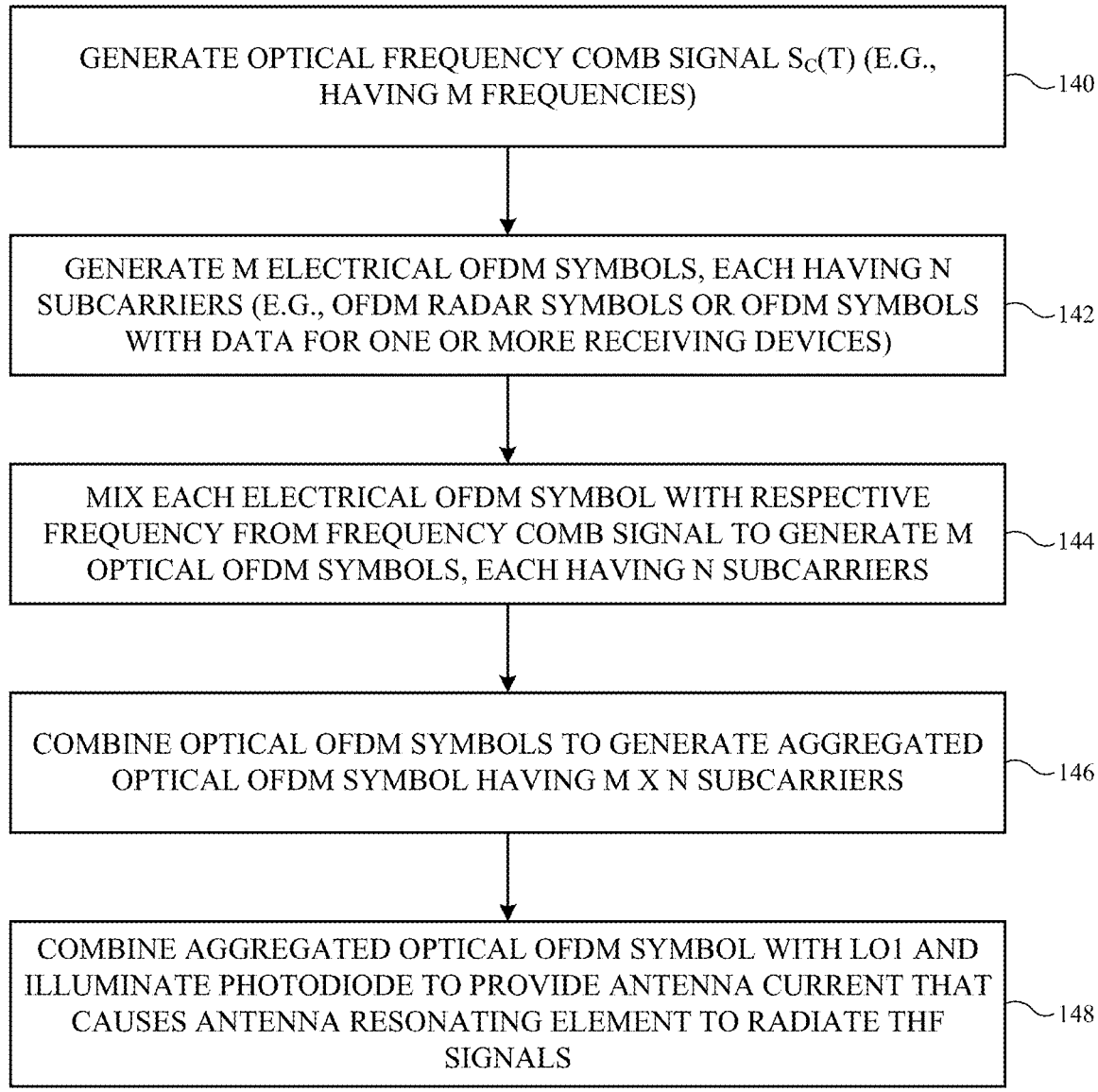
FIG. 10 is a flow chart of illustrative operations involved in transmitting wireless signals using an aggregate optical OFDM symbol in accordance with some embodiments.

FIG. 10 is a flow chart of operations that may be performed by wireless circuitry 24 of FIG. 8 to transmit THF signals 32 using aggregate optical OFDM symbol 126. Wireless circuitry 24 may transmit THF signals 32 with wireless data (from aggregate optical OFDM symbol 126) to one or more different external devices and/or for performing spatial ranging. Operations 140 and 142 may be performed concurrently.

At operation 140, optical frequency comb generator 102 may generate frequency comb signal $S_C(t)$. Frequency comb signal $S_C(t)$ may include M carriers 122 (e.g., at M different frequencies), as shown by plot 120 of FIG. 8. Optical demultiplexer 104 may provide a different respective carrier 122 from frequency comb signal $S_C(t)$ to each electro-optical modulator 108.

At operation 142, OFDM symbol generator 114 may generate M electrical OFDM symbols $x_m(t)$. Each of the M electrical OFDM symbols $x_m(t)$ may have N subcarriers. The electrical OFDM symbols $x_m(t)$ may include OFDM radar symbols or symbols with data for one or more receiving devices. OFDM symbol generator 114 may provide a different respective electrical OFDM symbol $x_m(t)$ to each electro-optical modulator 108.

At operation 144, each electro-optical modulator 108 may mix its received carrier 122 with its received electrical OFDM symbol $x_m(t)$ to generate a respective one of the M optical OFDM symbols 121 (e.g., concurrently in parallel). If desired, optical phase shifters 110 of FIG. 8 may apply optical phase shifts to optical OFDM symbols 121 (e.g., for performing beam steering).

At operation 146, optical combiner 116 may combine the M optical OFDM symbols 121 to produce aggregate optical OFDM symbol 126 on optical path 130 (e.g., in optical signals $S_T(t)$).

At operation 148, optical combiner 52 may combine aggregate optical OFDM symbol 126 (e.g., optical signals $S_T(t)$) with optical LO signal LO1 and may illuminate photodiode 42 with the combined aggregate optical OFDM symbol 126 and optical LO signal LO1. Photodiode 42 may produce corresponding THF signals 32 on antenna resonating element 36, which radiates the THF signals into free space.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-10 (e.g., the operations of FIG. 10) may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:
1. An electronic device comprising:
one or more processors configured to generate a first electrical symbol and a second electrical symbol;
one or more light sources configured to generate an optical signal having a first carrier at a first frequency and a second carrier at a second frequency different from the first frequency;

a first modulator configured to generate a first optical symbol by modulating the first carrier of the optical signal using the first electrical symbol;

a second modulator configured to generate a second optical symbol by modulating the second carrier of the optical signal using the second electrical symbol;

an antenna configured to transmit a radio-frequency signal generated based on the first optical symbol and the second optical symbol;

a first optical phase shifter that is external to the first modulator, that is coupled between the first modulator and the antenna, and that is configured to apply a first optical phase shift to the first optical symbol; and a second optical phase shifter that is external to the second modulator, that is coupled between the second modulator and the antenna, and that is configured to apply a second optical phase shift to the second optical symbol.

2. The electronic device of claim 1, wherein the first electrical symbol and the second electrical symbol each include a plurality of subcarriers, the first modulator is configured to generate the first optical symbol by modulating the plurality of subcarriers onto the first carrier, and the second modulator is configured to generate the second optical symbol by modulating the plurality of subcarriers onto the second carrier.

3. The electronic device of claim 2, further comprising:
a first optical combiner configured to generate an aggregate optical symbol based on the first optical symbol and the second optical symbol, the radio-frequency signal being generated based on the aggregate optical symbol, the first optical phase shifter being coupled between the first modulator and the first optical combiner, and the second optical phase shifter being coupled between the second modulator and the first optical combiner.

4. The electronic device of claim 3, further comprising:
an optical local oscillator (LO) configured to generate an optical LO signal; and
a second optical combiner configured to generate a combined optical signal by combining the optical LO signal with the aggregate optical symbol.

5. The electronic device of claim 4, wherein the antenna comprises:
an antenna radiating element; and
a photodiode configured to be illuminated by the combined optical signal and configured to produce the radio-frequency signal on the antenna radiating element based on the combined optical signal.

6. The electronic device of claim 5, further comprising:
an optical demultiplexer configured to receive the optical signal from the one or more light sources, the optical demultiplexer being configured to provide the first carrier to the first modulator and to provide the second carrier to the second modulator.

7. The electronic device of claim 1, wherein the optical signal generated by the one or more light sources comprises an optical frequency comb that includes the first carrier and the second carrier.

8. The electronic device of claim 1, wherein the first electrical symbol and the second electrical symbol comprise transmit data for transmission to one or more external devices.

9. The electronic device of claim 1, wherein the radio-frequency signal comprises a radar signal.

10. The electronic device of claim 1, wherein the radio-frequency signal is at a frequency greater than or equal to 100 GHz.

11. An electronic device comprising:
an optical demultiplexer;
one or more optical combiners;
a set of optical paths coupled in parallel between outputs of the optical demultiplexer and inputs of the one or more optical combiners;
a set of electro-optical modulators, each electro-optical modulator in the set of electro-optical modulators being disposed on a respective one of the optical paths in the set of optical paths;
a symbol generator coupled to the set of electro-optical modulators, the symbol generator being configured to provide a different respective electrical orthogonal frequency division multiplexing (OFDM) symbol to each electro-optical modulator in the set of electro-optical modulators;
a photodiode coupled to an output of the one or more optical combiners;
an antenna resonating element coupled to the photodiode;
a first light source configured to generate an optical local oscillator (LO) signal provided to an additional input of the one or more optical combiners; and
a second light source different from the first light source and configured to generate an optical frequency comb provided to the optical demultiplexer.

12. The electronic device of claim 11, wherein each of the electrical OFDM symbols comprises a plurality of subcarriers.

13. The electronic device of claim 12, wherein the set of optical paths comprises M optical paths, the optical frequency comb generator is configured to generate a frequency comb signal having at least M carriers, and the wavelength-selective switch is configured to pass a different respective one of the at least M carriers to each of the optical paths in the set of optical paths.

14. The electronic device of claim 11, further comprising:
a set of optical phase shifters, wherein each optical phase shifter in the set of optical phase shifters is disposed on a respective one of the optical paths.

15. The electronic device of claim 11, further comprising:
a first optical path that couples the first light source to the additional input of the one or more optical combiners; and
a second optical path that couples the second light source to an input of the optical demultiplexer.

16. The electronic device of claim 15, wherein no optical frequency combs are conveyed by the first optical path.

17. A method of operating an electronic device to transmit a radio-frequency signal, the method comprising:
generating, using one or more processors, a set of electrical orthogonal frequency division multiplexing (OFDM) symbols;
generating, using a set of electro-optical modulators, a set of optical OFDM symbols by mixing each electrical OFDM symbol in the set of electrical OFDM symbols with a different respective optical carrier;
generating, using a light source, an optical local oscillator (LO) signal;
generating, using an optical combiner, a combined signal by combining the optical LO signal with the set of optical OFDM symbols;
generating, using a photodiode, a current on an antenna resonating element based on the combined signal;
transmitting, using the antenna resonating element, a radio-frequency signal associated with the current;
suppressing a set of subcarriers from the OFDM symbols; and including, in the combined signals, an unmodulated signal at a frequency overlapping the set of subcarriers, the unmodulated signal being different from the optical LO signal.

18. The method of claim 17, further comprising:
generating, using one or more additional light sources, an optical frequency comb signal that includes the different respective optical carriers; and
distributing, using a wavelength-selective switch, the different respective optical carriers from the optical frequency comb signal to the set of electro-optical modulators.

19. The method of claim 17, wherein the unmodulated signal comprises a pilot signal, a beacon signal, a synchronization signal, or a reference signal.

* * * * *